(12) United States Patent
Byrd et al.

(10) Patent No.: US 10,746,089 B2
(45) Date of Patent: Aug. 18, 2020

(54) INLINE TURBOCHARGER ARRANGEMENT AND METHOD

(71) Applicant: Caterpillar Inc., Peoria, IL (US)

(72) Inventors: Jeremy Byrd, West Lafayette, IN (US); Eric L. Schroeder, Germantown Hills, IL (US); Liangtao Zhu, Dunlap, IL (US); Arvind Sivasubramanian, Peoria, IL (US); Ryan T. Sunley, Washington, IL (US); Craig P. Hittle, Dunlap, IL (US); Aaron L. Robinson, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 155 days.

(21) Appl. No.: 15/879,647

(22) Filed: Jan. 25, 2018

(65) Prior Publication Data

US 2019/0226389 A1 Jul. 25, 2019

(51) Int. Cl.
*F02B 37/02* (2006.01)
*F02B 37/007* (2006.01)
(Continued)

(52) U.S. Cl.
CPC ............ *F02B 37/025* (2013.01); *F01D 25/12* (2013.01); *F01D 25/14* (2013.01); *F01N 3/046* (2013.01); *F01N 13/001* (2013.01); *F01N 13/008* (2013.01); *F01N 13/1805* (2013.01); *F02B 37/002* (2013.01); *F02B 37/007* (2013.01); *F02B 37/22* (2013.01); *F02B 37/225* (2013.01); *F02C 6/12* (2013.01); *F02D 9/04* (2013.01); *F02D 13/0242* (2013.01); *F02D 41/0007* (2013.01); *F02D 41/221* (2013.01);
(Continued)

(58) Field of Classification Search
CPC .... F02B 37/001; F02B 37/007; Y02T 10/144; F02D 41/22–222
See application file for complete search history.

(56) References Cited

U.S. PATENT DOCUMENTS

| 4,228,655 | A | * | 10/1980 | Herschmann | ........... | F02B 37/00 251/129.1 |
| 4,457,134 | A | * | 7/1984 | Deutschmann | ....... | F02B 37/007 60/612 |

(Continued)

FOREIGN PATENT DOCUMENTS

| DE | 102012206355 | 10/2013 |
| GB | 2220987 B | 4/1992 |

*Primary Examiner* — Laert Dounis
(74) *Attorney, Agent, or Firm* — Leydig, Voit & Mayer, Ltd.

(57) ABSTRACT

An internal combustion engine having an exhaust log structure onto which a plurality of turbochargers is connected, each turbocharger having a turbine connected to the exhaust log structure and having an inlet fluidly connectable to a respective one of the plurality of outlet ports, an exhaust valve disposed at a turbine outlet such that the flow of exhaust gas out of the turbine is fluidly blocked, and an actuator associated with the exhaust valve and operating to move the exhaust valve from a closed position to an open position and vice versa. An electronic controller provides a command to the actuator to move the exhaust valve between the open and closed positions and is programmed to selectively open two one or more exhaust valves based on an operating condition of the engine.

18 Claims, 7 Drawing Sheets

(51) Int. Cl.

| | |
|---|---|
| F02C 6/12 | (2006.01) |
| F01N 13/00 | (2010.01) |
| F02D 13/02 | (2006.01) |
| F01N 13/18 | (2010.01) |
| F01D 25/12 | (2006.01) |
| F02D 41/00 | (2006.01) |
| F01D 25/14 | (2006.01) |
| F02B 37/22 | (2006.01) |
| F02B 37/00 | (2006.01) |
| F02D 9/04 | (2006.01) |
| F02B 75/22 | (2006.01) |
| F02F 1/42 | (2006.01) |
| F02B 75/18 | (2006.01) |
| F02M 35/116 | (2006.01) |
| F01N 3/04 | (2006.01) |
| F02D 41/22 | (2006.01) |
| F02B 33/40 | (2006.01) |
| F02M 35/10 | (2006.01) |
| F02B 39/00 | (2006.01) |

(52) U.S. Cl.
CPC ...... *F01N 2340/06* (2013.01); *F01N 2590/10* (2013.01); *F02B 33/40* (2013.01); *F02B 39/005* (2013.01); *F02B 75/228* (2013.01); *F02B 2075/1864* (2013.01); *F02F 2001/4278* (2013.01); *F02M 35/10157* (2013.01); *F02M 35/10255* (2013.01); *F02M 35/116* (2013.01); *F05D 2220/40* (2013.01)

(56) References Cited

U.S. PATENT DOCUMENTS

| | | | |
|---|---|---|---|
| 6,158,219 A * | 12/2000 | Mailander | F02B 37/007 60/606 |
| 6,279,320 B1 * | 8/2001 | Mailander | F02B 37/002 60/612 |
| 7,657,360 B2 | 2/2010 | Skowron | |
| 8,938,962 B2 | 1/2015 | Pierpont | |
| 9,127,624 B2 | 9/2015 | Peters et al. | |
| 2002/0056444 A1 * | 5/2002 | Chou | F02B 29/0412 123/559.1 |
| 2004/0020205 A1 * | 2/2004 | Mailander | F02B 37/007 60/612 |
| 2011/0252795 A1 * | 10/2011 | Heyes | F02B 37/001 60/611 |
| 2013/0192223 A1 * | 8/2013 | Pierpont | F02B 37/007 60/605.2 |
| 2014/0067228 A1 * | 3/2014 | Polkus | F02B 37/16 701/102 |
| 2014/0150423 A1 * | 6/2014 | Heyes | F02B 37/002 60/599 |
| 2014/0157773 A1 | 6/2014 | Matthews et al. | |
| 2016/0177795 A1 * | 6/2016 | McHenry | F01N 3/046 60/598 |
| 2016/0376932 A1 * | 12/2016 | Lintl | G06Q 10/06 60/327 |
| 2017/0298810 A1 * | 10/2017 | Thompson | F02B 37/12 |

* cited by examiner

FIG. 6

INLINE TURBOCHARGER ARRANGEMENT AND METHOD

TECHNICAL FIELD

This patent disclosure relates generally to internal combustion engines and, more particularly, to internal combustion engines having turbochargers.

BACKGROUND

Typical internal combustion engines having turbochargers operate by providing exhaust gas energy to drive one or more turbines, each of which is connected to and drives a respective air compressor. The compressors provide a charge, which may be cooled and which is provided to the engine cylinders during operation.

Internal combustion engines having more than one turbocharger connected in parallel are known, it is challenging to appropriately size the one, two or three turbochargers to achieve the desired power of the engine while also maintaining exhaust temperatures at a sufficiently low level to help reduce NOx emissions. One example of an engine having three turbochargers connected in parallel can be seen in Great Britain Patent Pub. No. GB 2220987B. This reference describes an engine having three turbochargers connected in parallel across the engine's intake and exhaust collectors. One of the three turbochargers is always connected to the engine, while the remaining two can be cut-in or cut-out depending on engine load operating conditions. While the solution may be at least partially effective in using appropriately sized turbochargers for the engine, there are efficiency losses in the way the turbochargers are connected in that pressure drops are introduced, and exhaust pulses are diminished or destroyed in the complex exhaust and intake piping used to connect the turbochargers with the rest of the engine. This can result in lower engine efficiency, which in turn increases fuel consumption and heat rejection in the engine, which can in turn also affect engine emissions.

SUMMARY

The disclosure describes, in one aspect, an internal combustion engine. The internal combustion engine includes a cylinder case having a plurality of cylinders, and a cylinder head connected to the cylinder case and forming a plurality of exhaust runners. The plurality of exhaust runners is fluidly connectable to the plurality of cylinders. An exhaust log structure includes a plurality of inlet ports fluidly connected directly to the plurality of exhaust runners, a plenum formed within a body of the exhaust log structure and being fluidly open to the plurality of inlet ports, a plurality of outlet ports being fluidly open to the plenum, and a water jacket surrounding at least the plenum. The internal combustion engine further includes a plurality of turbochargers, each turbocharger of the plurality of turbochargers including a turbine connected to the exhaust log structure and having an inlet fluidly connectable to a respective one of the plurality of exhaust log outlet ports, an exhaust valve disposed at one or more of the respective plurality of turbine outlet ports such that the turbine outlet is fluidly blocked when the exhaust valve is closed and fluidly open to the plenum when the exhaust valve is open, an actuator associated with the exhaust valve and operating to move the exhaust valve from a closed position to an open position and vice versa; and an electronic controller associated with the internal combustion engine and configured to provide a command to the actuator to move the exhaust valve between the open and closed positions. The electronic controller is programmed and configured to selectively open one or more exhaust valves based on an operating condition of the engine.

In another aspect, the disclosure describes a method for operating an engine. The method includes operating an engine having a plurality of cylinders, each cylinder including an exhaust runner; providing an exhaust log structure that includes: a plurality of inlet ports fluidly connected directly to the plurality of exhaust runners, a plenum formed within a body of the exhaust log structure and being fluidly open to the plurality of inlet ports, a plurality of outlet ports being fluidly open to the plenum, and a water jacket surrounding at least the plenum. The method further includes mounting a plurality of turbochargers onto the exhaust log structure, each turbocharger of the plurality of turbochargers including: a turbine connected to the exhaust log structure and having an inlet fluidly connectable to a respective one of the plurality of outlet ports, an exhaust valve disposed at the outlet of one or more of the plurality of turbocharger turbines such that the flow out of the turbine is fluidly blocked when the exhaust valve is closed and fluidly open when the exhaust valve is open, and an actuator associated with the exhaust valve and operating to move the exhaust valve from a closed position to an open position and vice versa. The method additionally includes providing an electronic controller associated with the internal combustion engine and configured to provide a command to the actuator to move the exhaust valve between the open and closed positions; wherein the electronic controller operates to selectively open two or more exhaust valves based on an operating condition of the engine.

In yet another aspect, the disclosure describes a method for diagnosing an operating health of a plurality of turbochargers associated with an engine. The method includes operating an engine having an exhaust conduit and an intake conduit, the exhaust conduit including an exhaust log structure having a plenum, the exhaust log structure being mounted inboard on an engine cylinder case; providing a plurality of turbochargers, each of the plurality of turbochargers having a turbine that is selectively fluidly connected to the exhaust conduit directly to the plenum of the exhaust log structure and a compressor that is selectively fluidly connected to the intake conduit, with one or more of the plurality of turbochargers containing an exhaust valve fluidly connected to the turbine outlet and a compressor shutoff valve fluidly connected between the compressor inlet and the intake conduit, the exhaust valve and the compressor shutoff valve being operated between open and closed positions by at least one actuator that is responsive to a command signal from an electronic controller such that the electronic controller can activate any one of the plurality of turbochargers by commanding the exhaust valve and compressor shutoff valve of that turbocharger to open, and deactivate any one of the plurality of turbochargers by commanding the exhaust valve and compressor shutoff valve of that turbocharger to close. The method further includes, at any time during engine operation, determining, using the electronic controller, which of the plurality of turbochargers is/are active and, for at least one active turbocharger, using the electronic controller to monitor one or more engine parameters to diagnose operation of at least one of the exhaust valve and the compressor shutoff valve.

DETAILED DESCRIPTION

Figure 1:
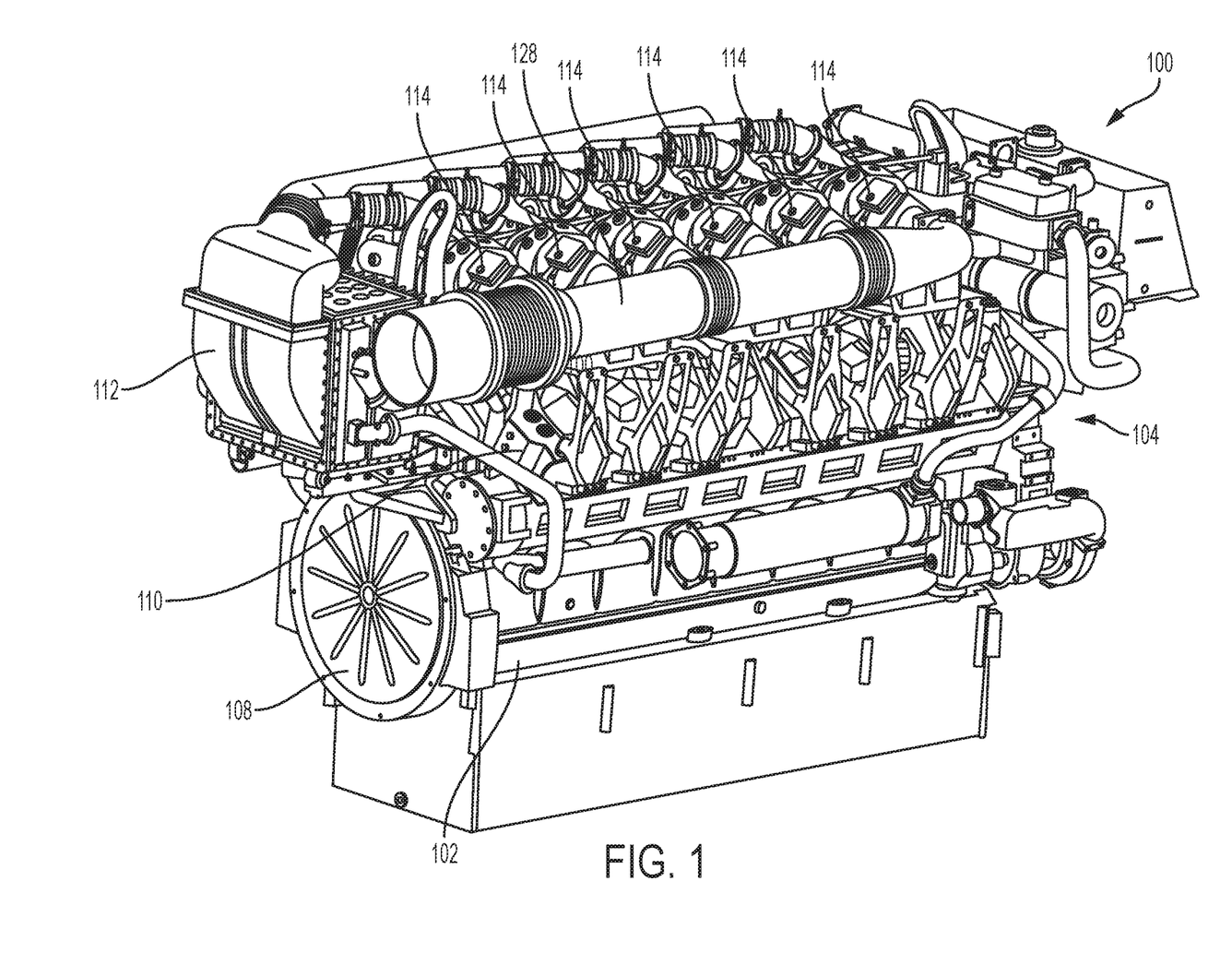
FIG. 1 is an outline view of an internal combustion engine in accordance with the disclosure.

An outline view of an engine 100 is shown from a side perspective in FIG. 1. The engine 100 shown has a V-configuration, as is known, but the present disclosure is applicable to other engine types such as engines having an "I" or, stated differently, an inline configuration. Moreover, while the engine 100 is shown to have a total of sixteen cylinders (eight cylinders per bank), engines having fewer or more cylinders are also suitable for the benefits of the present disclosure. The engine 100 includes a cylinder case 102 that houses a crankshaft (not shown). The crankshaft is connected to a plurality of pistons (not shown) via connecting rods (not shown). The pistons are slidably and reciprocally disposed in bores (not shown) formed in a cylinder case 104, which may be integrated into a single structure with the cylinder case 102, and power the crankshaft to provide a useful mechanical working motion to a flywheel 108 of the engine 100 in the known fashion. A plurality of cylinder heads 110 covers the top, open ends of the bores housing the pistons.

The cylinder head 110 includes valves for providing fuel and air to the cylinders, and also for removing exhaust gases and other byproducts from the cylinders during operation, in the customary fashion. Air is provided to the cylinders via an intake manifold, which receives a charge through an intercooler 112. Exhaust gases are provided to six turbochargers 114 from the various engine cylinders through an exhaust log structure, as will be described hereinafter.

Figure 2:
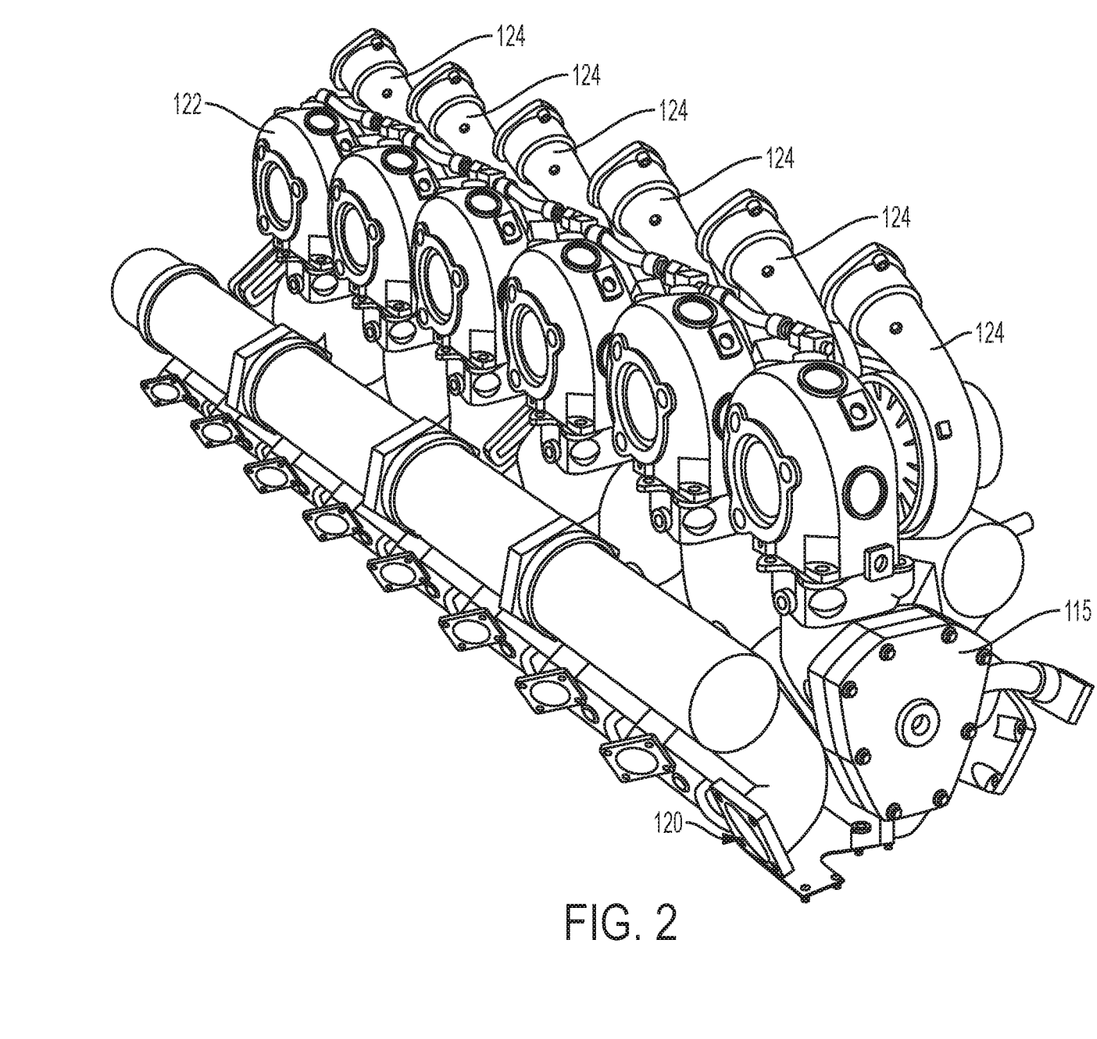
FIG. 2 is an outline view of an exhaust log structure, shown removed from the engine for illustration, in accordance with the disclosure.
Figure 4:
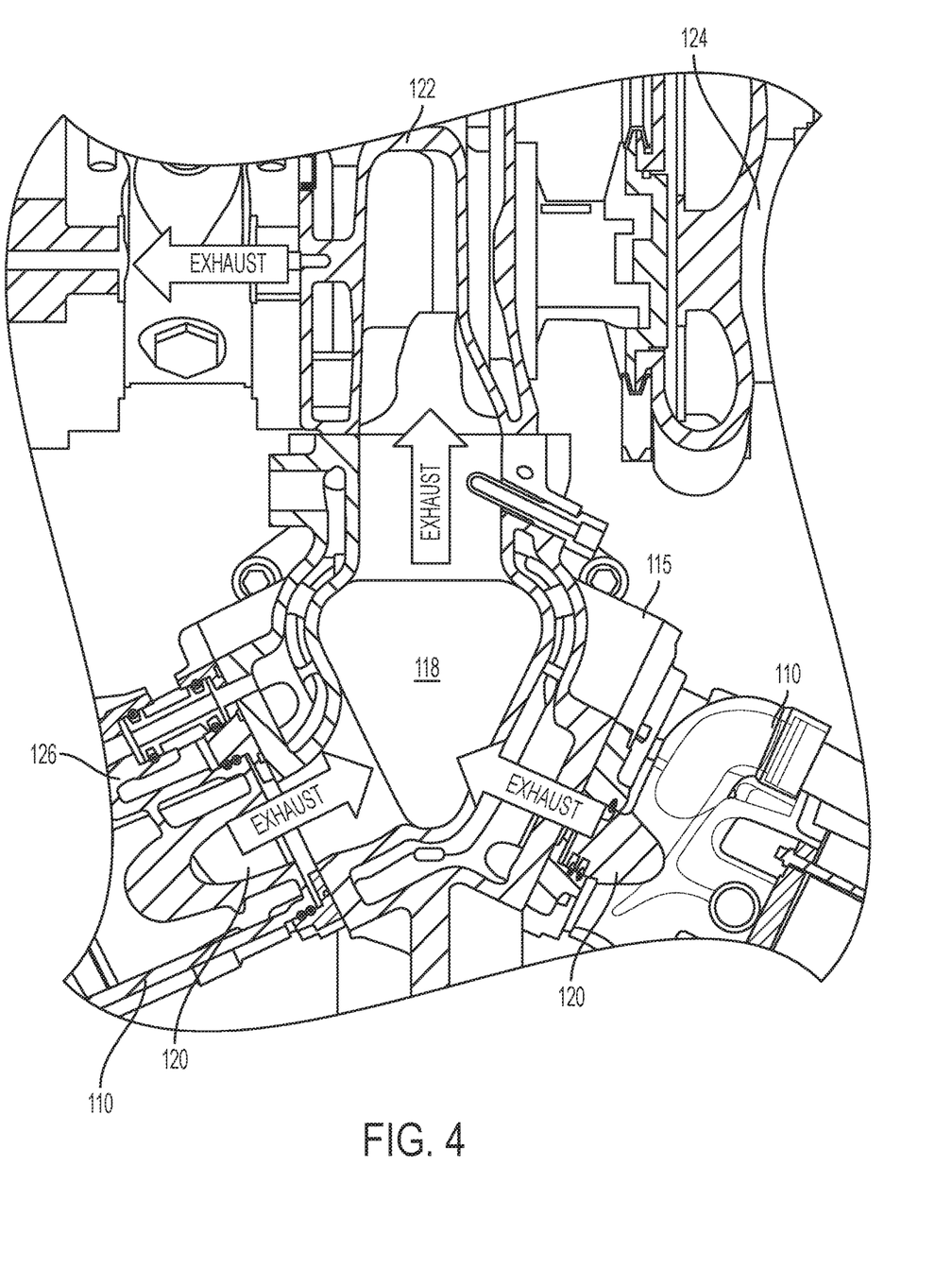
FIG. 4 is an enlarged detailed section view of a portions of the engine shown in FIG. 1.

A view of the exhaust log structure 115 is shown in FIG. 2, and in the detailed cross section of FIG. 4. In reference to these figures, the exhaust log structure 115 is disposed within the valley region of the engine 100 and connects directly onto the plurality of cylinder heads 110 mounted on either side of the engine's cylinder banks. Stated differently, the exhaust log structure is inboard relative to the cylinder case of the engine. The exhaust log structure 115 is an elongated structure that spans substantially the entire length of the cylinder case 102 along a rotational axis of the crankshaft (not shown) and forms a plenum or central exhaust collection cavity 118. The central exhaust collection cavity 118 includes inlet ports that are aligned with and fluidly connected with exhaust runners 120 formed in the respective cylinder heads 110 and communicate with the power cylinders of the engine such that, when the exhaust valves of the engine are open, exhaust gas from the cylinders can be routed into the collection cavity 118. In the illustrated, sixteen cylinder engine 100, the exhaust log structure 115 will include sixteen exhaust ports connected to as many exhaust runners 120 that supply exhaust gas under pressure and at exhaust temperature to the collection cavity 118 of the exhaust log structure 115.

Mounted directly onto the exhaust log structure 115 is the plurality of turbochargers 114, each of which includes a turbine 122 that is associated with a corresponding compressor 124. As shown, the engine 100 includes six turbocharger assemblies but fewer or more can be used depending on the size and displacement of the engine, the operating range of the engine, the size of the turbochargers, and the like. Because the turbines 122 are mounted directly onto the exhaust log structure 115, and to reduce the exhaust temperature of exhaust gas exiting the turbines to improve emissions, water cooling passages 126 through which coolant passes during engine operation are integrally formed in various structures including the cylinder heads 110 and, relevant to the present disclosure, the exhaust log structure 115. In the illustrated embodiment, any subset of the six turbochargers can be active and operate on the engine interchangeably and independently of the others.

During operation of the engine 100, exhaust gas from the various engine cylinders is provided into the collection cavity 118 of the exhaust log structure 115 from the exhaust runners 120, as previously described. While passing through the exhaust log structure 115, the exhaust gas may cool by transferring heat from the exhaust log structure via conduction to engine coolant or water passing through the cooling passages 126. Exhaust gas exits the turbines 122 and is collected in an exhaust collector 128 from where it can be routed to an exhaust stack (not shown). The exhaust gas passing through the turbines 122 provides power to operate the turbines, which power is in turn used to operate the compressors 124. The compressors receive air from the environment and compress the air, which is then provided as charge air to the engine cylinders in the known fashion.

Figure 3A:
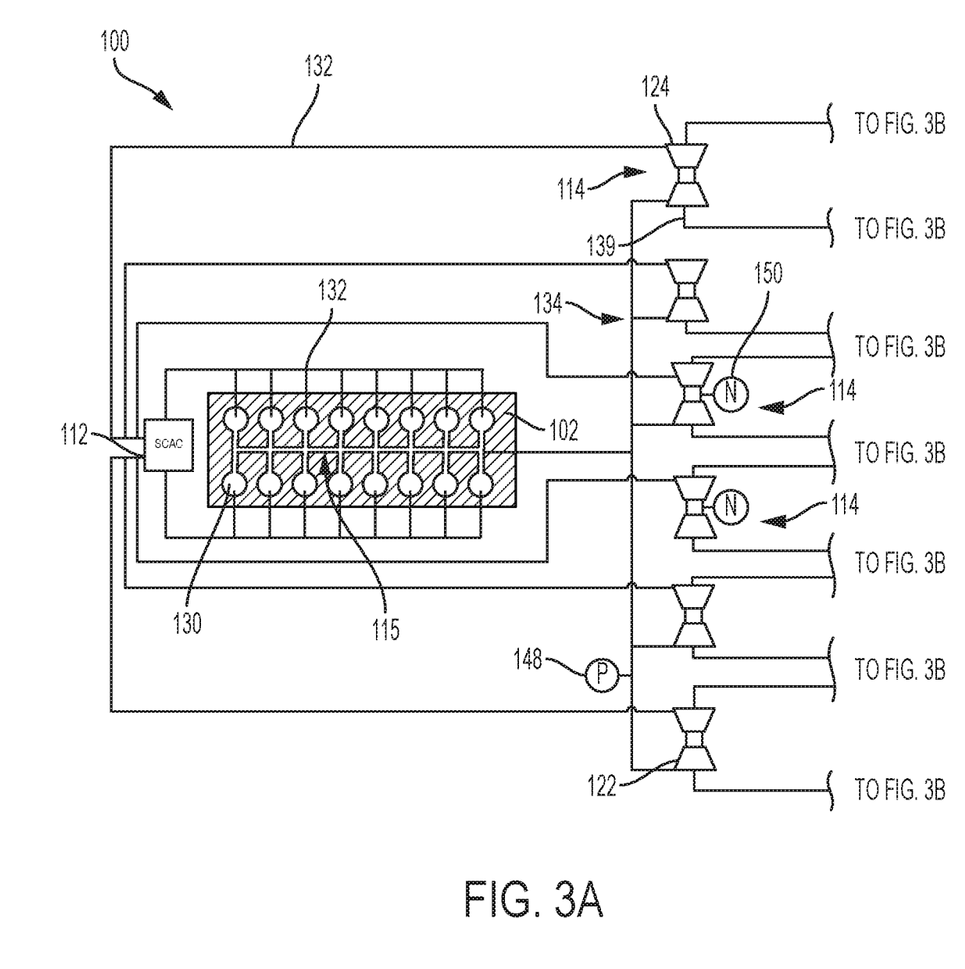
FIGS. 3A and 3B are schematic views of an engine in accordance with the disclosure.
Figure 3B:
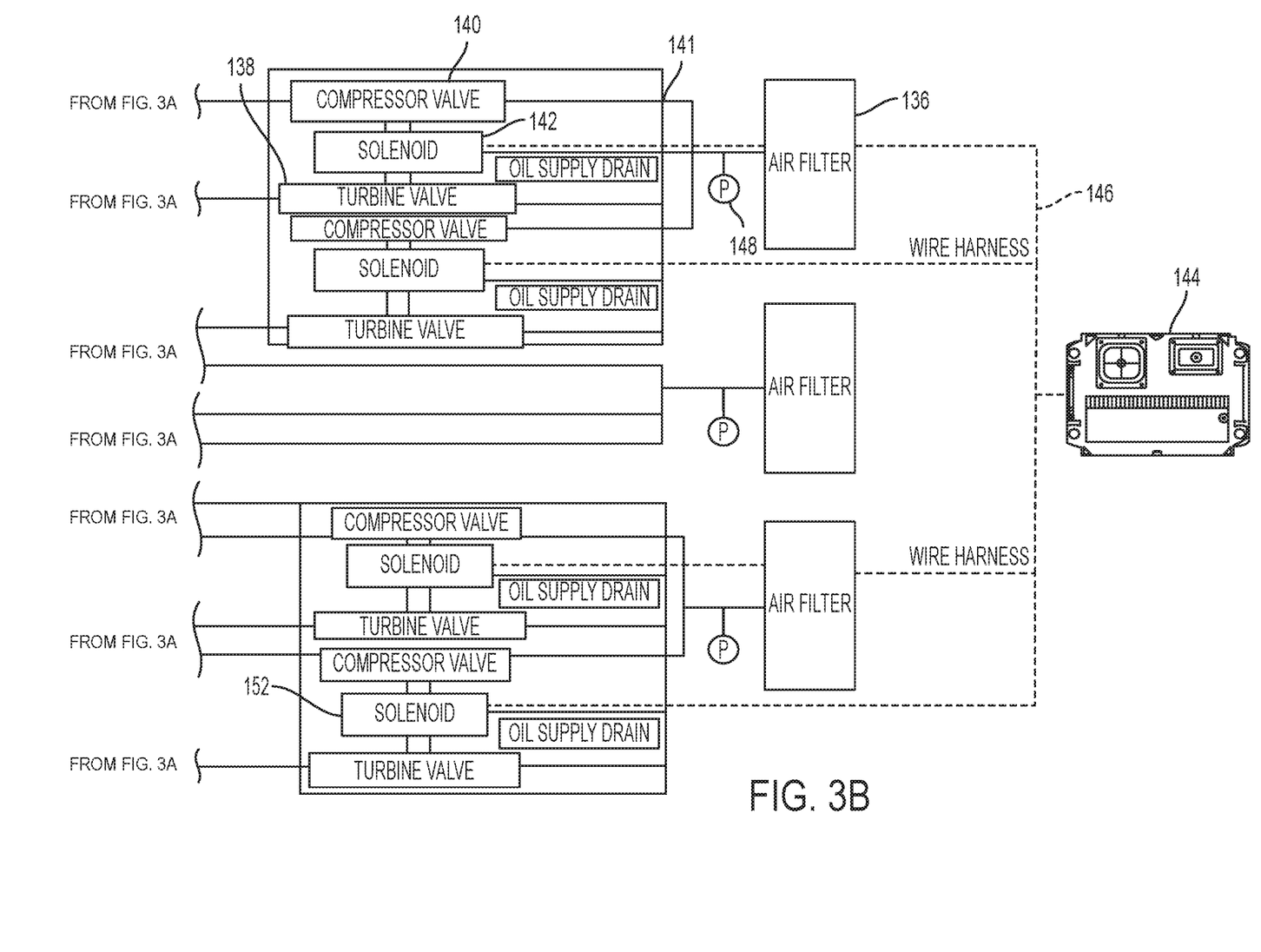

A schematic representation of the engine 100, to better illustrate certain components and systems of the engine's air system, is shown in FIG. 3. In reference to FIG. 3, where components and systems of the engine 100 that are the same or similar to corresponding components and systems previously described are denoted by the same reference numerals previously used for simplicity, the engine includes sixteen cylinders 130, which are selectively and fluidly connected to intake air conduits 132 and exhaust gas conduits 134. The intake air conduits 132, which include the charge air intercooler 112, are fluidly connected to each of six compressors 124. The compressors 124 draw air from respective airboxes 136. Similarly, each of the turbines 122 is fluidly connected to the exhaust gas conduits 134, which include the exhaust log structure 115 previously described.

In the illustrated embodiment, of the six turbochargers 114 that are included on the engine 100, two turbochargers 114, which are arranged in the center of the set of six turbochargers in the illustration, are continuously fluidly interconnected to the intake air conduits 132 and to the exhaust gas conduits 134, regardless of the operating mode of the engine 100. It should be appreciated that more than two or a single turbocharger 114 may be continuously connected to the engine in this fashion depending on the size of the turbocharger, engine power rating, engine size and the like.

The four remaining turbochargers 114 in the plurality of six turbochargers 114 of the engine 100 are selectively connectable or separable from the intake air conduits 132 and the exhaust gas conduits 134 of the engine 100 such that the effective turbocharger capacity or capability of the engine 100, in the aggregate, can be controlled between a 100% capacity, when all turbochargers are operating and fluidly connected, to a capacity of about 33%, when all selectively connectable turbochargers have been isolated from the system and only the two permanently connectable turbochargers are operating. As a practical matter, the turbochargers may be arranged in pairs such that the engine 100 may operate with one, two or all three pairs of turbochargers connected for operation. It can be appreciated that the turbochargers could also be arranged such that each turbocharger can be activated or deactivated individually and independently from the others, which means that the engine 100 may operate with any number of turbochargers fluidly connected to the exhaust gas conduits 134, depending on the engine power rating, engine size, and the like. Of those turbochargers, some may be connected to the engine at all times, while others may include valves to activate or deactivate their operation selectively during engine operation, for example, depending on engine operating conditions.

To fluidly include or isolate each of the four turbochargers 114 that are selectively connectable or activatable relative to the engine 100, each of the four turbochargers 114 includes a turbine valve 138 disposed along a turbine exhaust conduit 139, and a compressor valve 140 disposed along a compressor inlet conduit 141. A solenoid actuator 142 operates to control both the turbine and compressor valves 138 and 140, but separate actuators or a different type of actuator(s) can be used. During operation, each of the turbine and compressor valves 138 and 140 can be activated by the respective solenoid actuator 142 to completely fluidly block the turbine exhaust conduit 139 and the compressor inlet conduit 141 to fluidly and, thus, operationally, isolate and deactivate the respective turbocharger 114 from the engine 100. Correspondingly, a command provided to the solenoid actuator 142 to open the turbine and compressor valves 138 and 140 will reactivate the turbocharger 114 by fluidly reconnecting the same to the engine for exhaust gas to flow through the turbine and air or a mixture of air with exhaust gas to flow through the compressor during engine operation.

The solenoids 142, or any other actuators that may be used in their place in alternative embodiments, operate to selectively open and close the turbine and compressor valves 138 and 140 in response to respective command signals provided to the solenoids 142 individually and independently from one another by an electronic controller 144. The commands may be relayed to the solenoids 142 from the electronic controller 144 via communication lines 146, which may be embodied in any suitable fashion including, but not limited to, electrical lines carrying analog or digital information. The electronic controller 144 may be a single controller or may include more than one controller disposed to control various functions and/or features of a machine. For example, a master controller, used to control the overall operation and function of the engine or any machine with which the engine is associated, may be cooperatively implemented with a secondary or primary controller used to control the machine or engine. In this embodiment, the term "controller" is meant to include one, two, or more controllers that may be associated with the engine 100 and that may cooperate in controlling various functions and operations of the engine 100 (FIG. 1). The functionality of the controller, while described and shown conceptually in the present disclosure to include various discrete functions for illustrative purposes only, may be implemented in hardware and/or software without regard to the discrete functionality shown. Accordingly, various interfaces of the controller are described relative to components of the air system of the engine 100 are not intended to limit the type and number of components that are connected, nor the number of controllers that are described.

Accordingly, the communication lines 146 may further connect to various sensors that are associated with the air system of the engine. For example, pressure sensors 148 may be disposed before and/or after one or more of the compressors 124 and/or the turbines 122. The pressure sensor 148 may also be disposed between the compressor 124 and the compressor valve 140. The pressure sensor(s) 148 may be placed in fluid communication with intake and/or exhaust conduits 134 and/or 132, and operate to sense a pressure of air or exhaust gas and provide a pressure signal to the controller 144 indicative of the sensed pressure. Similarly, one or more turbochargers 114 may include a shaft speed sensor 150 associated with one or more turbochargers 114 and operating to provide a speed signal to the controller 144 indicative of the rotational speed of the respective turbocharger's shaft that connects the turbine wheel with the compressor impeller in a typical turbocharger configuration. Additional sensors may also be used, such as solenoid position sensors 152, oil pressure sensors (not shown) associated with an oil supply for oil used to activate hydraulic valves associated with the solenoids 142, and others.

INDUSTRIAL APPLICABILITY

The present disclosure is applicable to internal combustion engines and, particularly, to engines having a plurality of turbochargers arranged in a parallel circuit flow configuration for both exhaust gas and fresh air provided from and to the engine.

Figure 5:
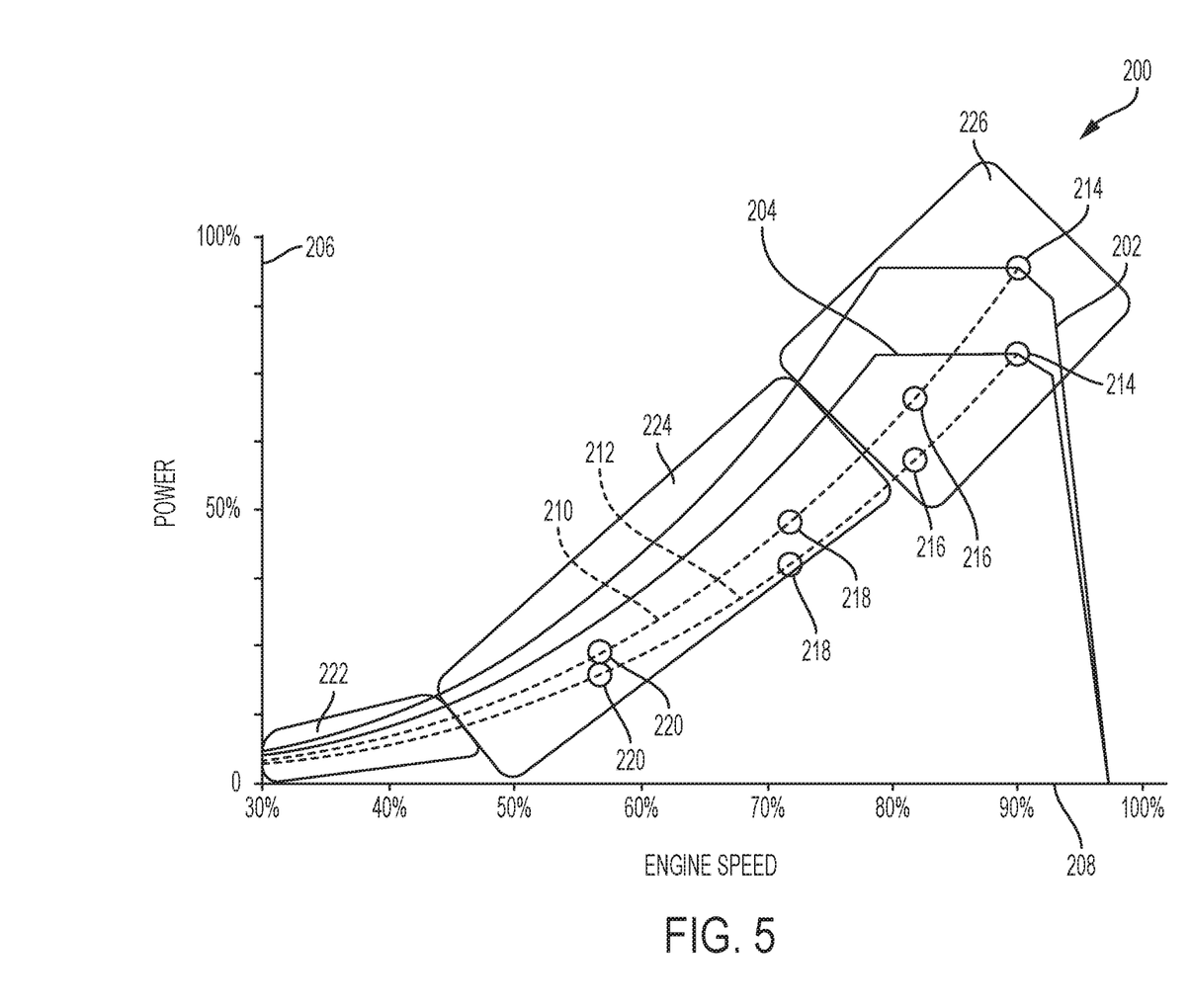
FIG. 5 is a qualitative engine map in accordance with the disclosure.

A qualitative chart 200 illustrating two exemplary engine maps is shown in FIG. 5. The chart 200 illustrates a first power curve 202 and a second power curve 204, which represent the power curves of two different engines having different power ratings to illustrate the applicability of the systems and methods of the present disclosure to a wide range of engine applications. The first and second power curves 202 and 204 are plotted against engine power 206, which is arranged along the vertical axis of the chart, and engine speed 208, which is arranged along the horizontal axis of the chart. Both power curves 202 and 204 have a typical shape that increases gradually towards a plateau. First and second dashed lines 210 and 212 show, respectively, a possible engine operating arrangement of points, for example, during acceleration or deceleration. Operating points are indicated on both curves, which include rated power points 214, 90% of maximum engine speed points 216, 80% of maximum speed points 218, and 40% of maximum engine speed points 220.

Each of the engines to which the power curves 202 and 204 correspond may have a six-turbocharger arrangement like that shown in FIG. 1, and also in FIG. 3, in which turbochargers are selectively connected to or isolated from the air system of the engine 100. In this respect, different operating regions of the engine can be configured such that fewer than all six turbochargers may be active, which improves transient engine response and also improves engine emissions, reduces engine heat rejection and others.

Accordingly, in a first region 222, which encompasses relatively low engine speeds and power outputs, two turbochargers may be active and four turbochargers may be inactive or fluidly separated or isolated from the engine air system. In a second region 224, which encompasses mid-range engine speeds and power outputs, two of the inactive turbochargers may be activated relative to the first region 222 such that four turbochargers may be active and two turbochargers may be inactive. Finally, in a third region 226, which encompasses high-range engine speeds and power outputs, all six turbochargers may be active. It should be appreciated that the number of operating regions described in FIG. 5 would equal the number of turbochargers allowed to be fluidly separated and connected to the system by the electronic controller 144, so that more or fewer operating regions may exist than is shown in this embodiment.

An engine controller, for example, the electronic controller 144 (FIG. 3) may monitor, calculate or otherwise determine engine speed and power output, in real time, and send appropriate commands to the solenoids 142 (FIG. 3) to activate or deactivate turbochargers individually or in pairs depending on whether the engine is operating in the first, second or third region 222, 224 or 226. In some embodiments, transition of engine operation from one region to another may include at least some hysteresis so engine is stable. In one embodiment, for example, for engines that may rarely operate in the third region 226, the controller 144 may mix and match the pairs of turbochargers that are activated during operation the second region 224 such that all turbochargers mounted on the engine have an equal opportunity to operate and wear at relatively the same rate over the life of the engine. For example, if four selectively activatable turbochargers are present in the engine, the controller may follow a sequence of turbocharger activation and perform health-checks of active turbochargers to determine their state.

In the illustrated embodiment, the controller may include an uptime time counter for each selectively activatable turbocharger, and select the turbocharger(s) with the lowest uptime for activation while no faults have been detected for any one of the particular turbochargers in queue for activation. Alternatively, and while no faults are detected, the electronic controller may track a predefined set of turbochargers or turbocharger pairs for activation, which are arranged to activate different turbochargers at different times. These predefined pairs can be made up by a sequence containing different permutations of turbocharger pairs selected from the group of available turbochargers on the engine that can be put online. For example, for turbochargers denoted as A, B, C and D, the sequence of turbocharger pairs can be: AB, BC, CD, DA, AC, BD and so forth. When a fault is detected in a particular turbocharger, that turbocharger can be taken out of service and the remaining turbochargers cycled through accordingly. The changes to the active turbochargers can be carried out either when changing the operating regions of the engine, and also during an engine de-rate condition, where power is reduced temporarily during normal operation before increasing again.

For determining a fault in a turbocharger, or for generally determining the component health of turbochargers placed into service in real time, the electronic controller may monitor various system parameters including turbocharger shaft speed and pressure at the inlet of the compressor. The methodology includes cycling the actuator and monitoring system parameters when the actuator causes the turbocharger to activate or deactivate. In this way, when a turbocharger is activated, the controller may monitor turbocharger shaft speed following turbine activation, to determine whether the turbine speed is increasing as expected, and also monitor pressure at the inlet of the compressor to confirm that the compressor shutoff valve opened when commanded. Similarly, when a turbocharger is deactivated, the controller may monitor turbine shaft speed to confirm that the shaft is decelerating, and also monitor pressure at the inlet of the compressor to confirm that the compressor shutoff valve closed when commanded. The controller, which may cycle through all available turbochargers at different times, as discussed above, can thus determine the functional state of all turbochargers.

Figure 6:
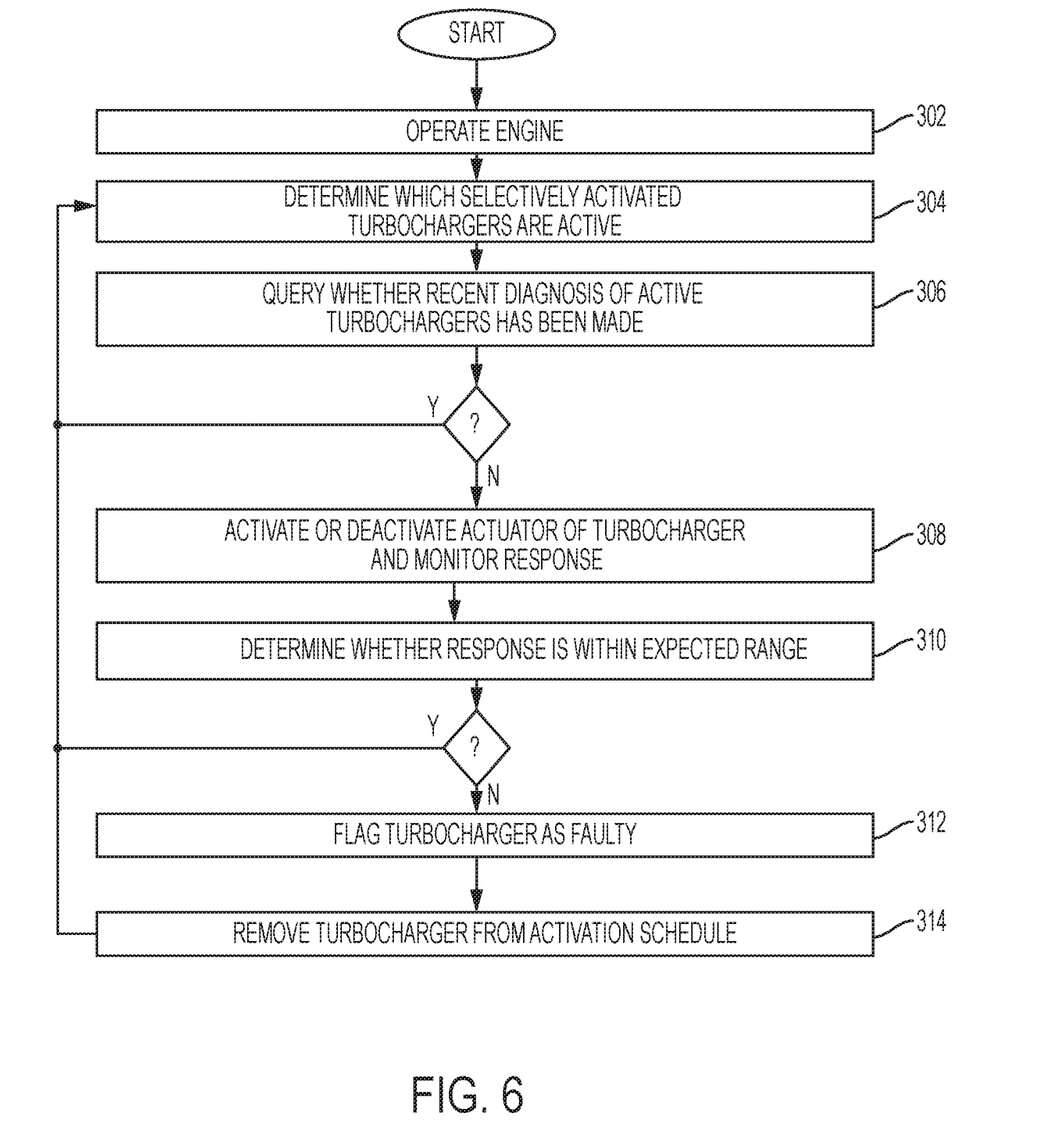
FIG. 6 is a flowchart for a method of diagnosing faults in an engine in accordance with the disclosure.

A flowchart for a method of determining component health of turbochargers mounted on an engine is shown in FIG. 6. In accordance with the method, an engine is operated at 302. The engine may include two or more selectively activatable turbochargers, which can be placed into service or taken out of service in accordance with an engine operating condition and a schedule. At 304, an interrogation is made as to which selectively activatable turbochargers are active, and at 306, a query is made as to whether a recent diagnosis of the operating state of any of the active turbochargers has been made. In this respect, the health of the turbochargers, or the valves that control their operation, may be determined periodically, for example, every 200 hours of engine operation and while the respective turbochargers are active. When it is determined that the health of an active turbocharger has not recently been made, a diagnostic process is initiated which includes monitoring engine parameters at 308 when turbochargers are activated or deactivated at 306, as discussed above. When the response is close to an expected range, the process repeats, otherwise, the turbocharger is flagged as having a fault at 312 and the turbocharger is removed from the usage schedule or activation sequence at 314 until after a diagnosis and remediation of the fault has been made.

In one exemplary embodiment of the method, especially for turbochargers having an exhaust cutoff valve and an compressor inlet valve operated by a single actuator, as is the case in the embodiment shown in FIG. 3, a command to open the turbine and compressor valves can be used to determine the health of the turbine on the basis of shaft speed, and also the health of the compressor valve on the basis of a change in compressor inlet pressure at a location downstream of the compressor inlet valve and upstream of the compressor.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An internal combustion engine, comprising:
a cylinder case having a plurality of cylinders, the cylinder case having a Vee configuration in which the plurality of cylinders is arranged along two cylinder banks disposed on either side of a valley;
a plurality of cylinder heads connected to the cylinder case and forming a plurality of exhaust runners, the plurality of exhaust runners being fluidly connectable to the plurality of cylinders;
a singular exhaust log structure, the singular exhaust log structure including:
a body disposed in the valley and having an elongate shape that extends along substantially an entire length of the cylinder case,
a plurality of inlet ports extending through the body and being fluidly connected directly to the plurality of exhaust runners at all times,
a singular plenum formed within the body of the singular exhaust log structure and being fluidly open to the plurality of inlet ports at all times, such that the singular plenum receives exhaust gas from all cylinders of the plurality of cylinders,
a plurality of outlet ports extending through the body and being fluidly open to the singular plenum, and
a water jacket formed in the body and surrounding at least the singular plenum;
a plurality of turbochargers connected directly onto the body, each turbocharger of the plurality of turbochargers including:
a turbine connected to the singular exhaust log structure and having an inlet fluidly connectable to a respective one of the plurality of outlet ports,
a turbine valve disposed at an outlet of the turbine such that the flow of exhaust gas out of the turbine is fluidly blocked from escaping the turbine when the turbine valve is closed and fluidly open when the turbine valve is open,
an actuator associated with the turbine valve and operating to move the turbine valve from a closed position to an open position and vice versa; and
an electronic controller associated with the internal combustion engine and configured to provide a command to the actuator to move the turbine valve between the open and closed positions;
wherein the electronic controller is programmed and configured to selectively open one or more turbine valves based on an operating condition of the engine.

2. The internal combustion engine of claim 1, wherein the plurality of turbochargers includes six turbochargers.

3. The internal combustion engine of claim 1, wherein the operating condition of the engine includes an engine speed and an engine power output.

4. The internal combustion engine of claim 1, wherein each turbocharger of the plurality of turbochargers further includes a compressor connected to the turbine, and a compressor shutoff valve disposed to fluidly isolate an inlet of the compressor from an intake conduit of the internal combustion engine.

5. The internal combustion engine of claim 4, wherein the actuator is further associated with the compressor shutoff valve such that the compressor shutoff valve is closed when the turbine valve is closed and the compressor shutoff valve is open when the turbine valve is open.

6. The internal combustion engine of claim 1, further comprising an additional plurality of turbochargers, each of the additional plurality of turbochargers having a turbine that is fluidly connected at all times to the singular plenum.

7. A method for operating an engine, the method comprising:
operating an engine having a plurality of cylinders, each cylinder including an exhaust runner, wherein the cylinders are disposed in a cylinder case of the engine, the cylinder case having a Vee configuration in which the plurality of cylinders is arranged along two cylinder banks disposed on either side of a valley;
providing a singular exhaust log structure that includes:
a body disposed in the valley and having an elongate shape that extends along substantially an entire length of the cylinder case,
a plurality of inlet ports extending through the body and being fluidly connected directly to the plurality of exhaust runners at all times,
a singular plenum formed within the body of the singular exhaust log structure and being fluidly open to the plurality of inlet ports at all times, such that the singular plenum receives exhaust gas from all cylinders of the plurality of cylinders,
a plurality of outlet ports extending through the body and being fluidly open to the singular plenum, and
a water jacket formed in the body and surrounding at least the plenum;
mounting a plurality of turbochargers directly onto the singular exhaust log structure, each turbocharger of the plurality of turbochargers including:
a turbine connected to the singular exhaust log structure and having an inlet fluidly connectable to a respective one of the plurality of outlet ports,
a turbine valve disposed at an outlet of the turbine such that the flow of exhaust gas out of the turbine is fluidly blocked from escaping the turbine when the turbine valve is closed and fluidly open when the turbine valve is open, and
an actuator associated with the turbine valve and operating to move the turbine valve from a closed position to an open position and vice versa; and
providing an electronic controller associated with the internal combustion engine and configured to provide a command to the actuator to move the turbine valve between the open and closed positions;
wherein the electronic controller operates to selectively open two or more turbine valves based on an operating condition of the engine.

8. The method of claim 7, wherein the plurality of turbochargers includes six turbochargers.

9. The method of claim 7, wherein the operating condition of the engine includes an engine speed and an engine power output.

10. The method of claim 7, wherein each turbocharger of the plurality of turbochargers further includes a compressor connected to the turbine, and a compressor shutoff valve disposed to fluidly isolate an inlet of the compressor from an intake conduit of the internal combustion engine.

11. The method of claim 10, wherein the actuator is further associated with the compressor shutoff valve such that the compressor shutoff valve is closed when the turbine valve is closed and the compressor shutoff valve is open when the turbine valve is open.

12. The method of claim 7, further comprising an additional plurality of turbochargers, each of the additional plurality of turbochargers having a turbine that is fluidly connected at all times to the singular plenum.

13. The method of claim 7, wherein opening one or more turbine valves is accomplished by increasing a number of turbine valves that are open when engine speed and engine power output increase above a threshold, and correspondingly decreasing the number of turbine valves that are open when the engine speed and engine power output decrease below the threshold.

14. The method of claim 7, wherein opening one or more turbine valves is accomplished by increasing a number of turbine valves that are open when the engine operates in a transient mode and the internal combustion engine is accelerating.

15. A method for diagnosing an operating health of a plurality of turbochargers associated with an engine, the method comprising:
- operating an engine having an exhaust conduit and an intake conduit, the exhaust conduit including a singular exhaust log structure, the singular exhaust log structure including a body having an elongate shape that extends along substantially an entire length of a cylinder case of the engine, the cylinder case of the engine having a Vee configuration in which a plurality of cylinders is arranged along two cylinder banks disposed on either side of a valley, the body forming a singular plenum that is fluidly connected to exhaust runners of the plurality of cylinders at all times, the singular exhaust log structure being mounted inboard on the cylinder case and disposed in the valley;
- providing a plurality of turbochargers mounted directly onto the body, each of the plurality of turbochargers having a turbine that is selectively fluidly connected to the exhaust conduit directly to the singular plenum of the exhaust log structure via a turbine valve and a compressor that is selectively fluid connected to the intake conduit via a compressor shutoff valve, the turbine valve and the compressor shutoff valve being operated between open and closed positions by at least one actuator that is responsive to a command signal from an electronic controller such that the electronic controller can activate any one of the plurality of turbochargers by commanding the turbine valve and the compressor shutoff valve of that turbocharger to open, and deactivate any one of the plurality of turbochargers by commanding the turbine valve and the compressor shutoff valve of that turbocharger to close;
- at any time during engine operation, determining, using the electronic controller, which of the plurality of turbochargers is/are active;
- for at least one active turbocharger, using the electronic controller to provide a signal to activate or deactivate the respective actuator and to monitor system parameters to determine whether the system parameters dynamically respond to the signal in a desired fashion; and
- when the system parameters are determined to respond in an undesired fashion, flagging a fault in the electronic controller and removing the at least one active turbocharger from service.

16. The method of claim 15, further comprising using the electronic controller to query whether a recent diagnosis of the at least one active turbocharger has been made, and defer providing the signal until after a predefined period of time has elapsed since the recent diagnosis.

17. The method of claim 15, further comprising diagnosing an operational state of the turbine valve of the at least one active turbocharger by commanding the turbine valve to open and by monitoring a turbine shaft speed signal.

18. The method of claim 17, further comprising diagnosing an operational state of the compressor shutoff valve of the at least one active turbocharger by commanding the compressor shutoff valve to open and by monitoring an air pressure at a location between the compressor shutoff valve and an inlet of the compressor of the at least one active turbocharger.

* * * * *